(No Model.)
C. L. COFFIN.
ELECTRIC LINK WELDING MACHINE.
No. 470,038. Patented Mar. 1, 1892.
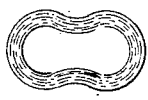
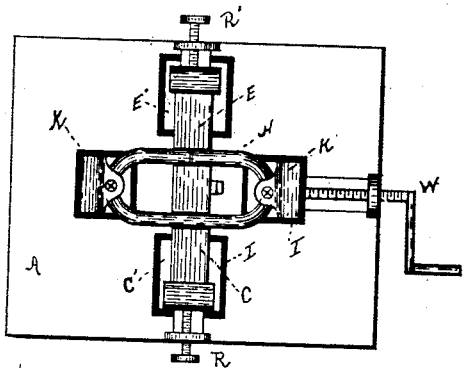
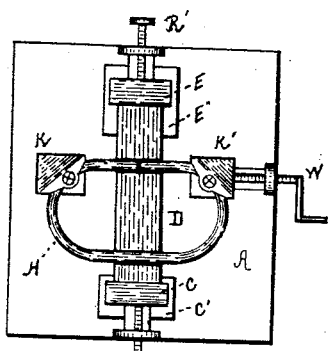
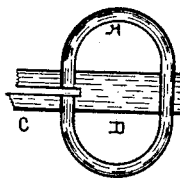
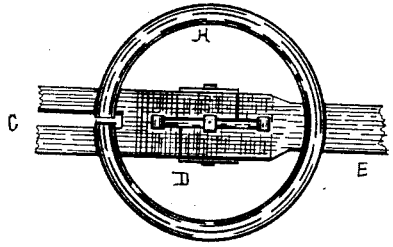
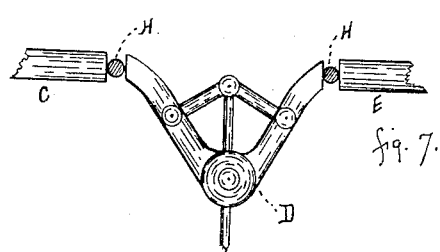
Witnesses:
Gertrude H. Anderson
Geo. H. Lothrop
Inventor:
Charles L. Coffin

UNITED STATES PATENT OFFICE.

CHARLES L. COFFIN, OF DETROIT, MICHIGAN.

ELECTRIC LINK-WELDING MACHINE.

SPECIFICATION forming part of Letters Patent No. 470,038, dated March 1, 1892.

Application filed April 25, 1891. Serial No. 390,446. (No model.)

*To all whom it may concern:*

Be it known that I, CHARLES L. COFFIN, of Detroit, in the county of Wayne and State of Michigan, have invented a new and useful Improvement in Apparatus for Forging, Working, and Welding Links, Tires, Hoops, Tubes, and Continuous Forms, of which the following is a specification.

My invention consists in an apparatus for forging, working, and welding links, tires, hoops, tubes, and continuous forms hereinafter fully described and claimed.

Figures 1 and 2 are top plan views differing only in slight change of position in the clamps. Fig. 3 is an elevation of a square link. Fig. 4 is a diagram showing a split instead of a continuous conductor. Fig. 5 represents an upset link. Fig. 6 is a plan view, and Fig. 7 is a side elevation, showing an adjustable internal conductor. Fig. 8 is a plan of a link in the form of a figure 8, and Fig. 9 is a plan of a link to be welded in a scarf-joint.

A represents a table provided with clamps K and K', insulated therefrom to hold the link to be welded, and one of them, as K', is made movable by a screw W to press the ends of the link together for welding. In the ordinary method of welding by passing a heating-current through the link the volume of the current may be greater than that which the solid part of the link can carry without heating; and the object of my invention is to avoid the great waste of this process by passing the current transversely across the ends which are to be welded and the opposite portion of the link.

E represents a conductor movably carried on table A, but insulated therefrom and connected at E' with one pole of a generator of electricity, which I have here intended to represent as one terminal of the secondary of a transformer or converter, though any suitable source of electricity may be used. The arrangement of conductor E is such that it may be brought into contact with the link held between the clamps K K' and the mechanism shown in the drawings for that purpose being a screw-shaft R'.

D represents a conductor inserted in the opening in the link opposite conductor E to furnish a short path for the current, instead of having the same travel around the link.

C represents a conductor similar to E, and likewise movably mounted on the table A, but insulated therefrom, so that it may be brought into contact with the other side of the link opposite conductor E, and this conductor C is connected at C' with the other pole of the generator.

The operation of this invention is as follows: The parts being in the position shown in Figs. 1 or 2, the current is turned on and in entering conductor E traverses the ends of the link in cross-section, developing heat at the points of contact, then principally passes through conductor D, through the link at the point opposite the point of welding, and all through conductor C to the other pole of the generator, thus heating the point to be welded and a point immediately opposite. When the link is brought to a welding heat, the current may be shut off and a clamp K' is moved by screw W, thus forcing the open end of the link together and forming a weld, and at the same time upsetting to some extent the heated portion of the link opposite the weld, the finished link being approximated as represented in Fig. 5.

In the arrangement shown in Fig. 2 the effect is that where the clamps K K' are at one side of the link instead of on the central line the heated part of the link opposite the weld will be rather bent than upset.

In Figs. 1 and 2 I have represented conductor D as a simple block of conductive material placed in the opening of the link and in contact with each side of the opening. As, however, these openings may vary in size, the conductor D may be made jointed, as shown in Fig. 7, and provided with any desired mechanism for opening or closing it, the mechanism herein illustrated being the ordinary toggle-joint.

In the arrangement shown in Fig. 6 one of the conductors (marked C) is made double, so as to abut against the edge of the link or ring H, while one end of the interior or bridging conductor D, which is here shown as a two-part adjustable conductor, one part sliding upon another, is shown slightly forked at its end. In Fig. 4 the conductor C is also shown double, the conductor E being like that shown in Figs. 1 and 2—that is, non-adjustable, but slightly forked at the end.

What I claim as my invention, and desire to secure by Letters Patent, is—

1. In an apparatus for electrically welding, working, or forging links or rings, the combination, with an insulated support to hold the link, of means for compressing the link endwise, an electrical conductor adapted to connect the open ends of the link with one pole of a generator of electricity, an electrical conductor adapted to connect that point of the link opposite the ends with the other pole of said generator, and means for electrically connecting the ends of the link with the opposite side thereof across the opening of the link, substantially as and for the purpose set forth.

2. In an apparatus for electrically welding, working, or forging links or rings, the combination of insulated clamps to hold the link, a movable conductor connected with one pole of a generator of electricity in contact with the ends of the link to be welded, an interior conductor connecting the ends to be welded with the opposite part of the link, and a conductor connecting the link opposite the point of welding with the other pole of the generator, substantially as shown and described.

3. In an apparatus for electrically working, welding, or forging links or rings, the combination of two clamps for holding the link, means for moving one of the clamps, electrical conductors connected with the poles of a generator and adapted to make contact with opposite points on the outside of the link, and an internal conductor adapted to connect the two sides of the link, substantially as shown and described.

4. In an apparatus for electrically welding, working, or forging links or rings, the combination of two clamps for holding the link, means for moving one of the clamps, electrical conductors connected with the poles of a generator and adapted to make contact with opposite points on the outside of the link, and an internal adjustable conductor adapted to connect the two sides of the link, substantially as shown and described.

CHARLES L. COFFIN.

Witnesses:
GERTRUDE H. ANDERSON,
GEO. H. LOTHROP.